UNITED STATES PATENT OFFICE.

ROYER LUCKENBACH, OF BROOKLYN, NEW YORK, ASSIGNOR TO LUCKENBACH PROCESSES, INC., OF SAN FRANCISCO, CALIFORNIA, A CORPORATION OF NEVADA.

FROTHING AND MINERAL SELECTIVE AGENT AND PROCESS OF USING THE SAME.

1,386,716.     Specification of Letters Patent.     Patented Aug. 9, 1921.

No Drawing.     Application filed April 5, 1918. Serial No. 226,833.

*To all whom it may concern:*

Be it known that I, ROYER LUCKENBACH, a citizen of the United States, residing in the borough of Brooklyn, county of Kings, city and State of New York, have invented certain new and useful Improvements in Frothing and Mineral Selective Agents and Processes of Using the Same, of which the following is a specification.

This invention relates to the concentration of ores for the recovery of the valuable constituents thereof from the gangue, and more particularly to the separation of ores by flotation methods with which those skilled in the art have become familiar of recent years.

It is based upon the discovery of new mineral selective and frothing agents and combinations, or mixtures, of the same, by means of which a higher percentage of recovery from the ore can be obtained than with flotation methods using selective materials heretofore employed. In the practice of the flotation methods using certain of these newly discovered mineral selective and frothing agents, it is possible to recover not only sulfids as before, but to also recover free metals, carbonates, oxids and silicates, which are not recoverable in the practice of the oil flotation methods. In addition to recovering metals and their compounds certain non-metallic minerals such as graphite and sulfur may be raised.

By this invention a simple, cheap and very efficient mineral selective and frothing agent is disclosed while, at the same time, the invention is further advantageous in that it does not involve the use of free oils. If desired, however, the mineral selective and frothing agents of this invention may also be used in combination with oils, should any occasion arise for the use of an oil.

Other objects and advantages of the invention will be appreciated from a reading of the following description and claims.

The invention involves the use of a a resinous substance as the mineral selective and frothing agent, and particularly, the resins copal, shellac, rosin (colophony) or combinations of any two or more of them in the form of solutions made by dissolving each of them in a suitable solvent.

Any other of the resins may likewise be used, but those mentioned are preferable since other resins are not so desirable either because, when sufficiently inexpensive for use, they do not possess equally as good selective characteristics as those resins specifically mentioned, or else they are so expensive as not likely to be used for that reason.

Ammonia may be added to certain of the resins above mentioned with particularly efficacious results.

Likewise oleic acid, or animal oil or grease such as tallow, may be employed in combination with the resins above mentioned in such manner that the oleic acid, grease, or tallow, will have the oil constituents neutralized, so that in the solution as employed no free oils will exist. Furthermore, as already indicated, if desired, for any reason other oils capable of reacting with other ingredients of the mixture may be combined with the resins specifically enumerated above.

The method of preparing the resins each specifically mentioned will now be considered with respect to each separately.

Rosin (colophony) is dissolved in an alkali water in which it is boiled until it is of the consistency approximating that of milk. Ordinarily, one part of rosin to one part of the alkali such as caustic soda, for example, placed in the water, will give the general character of solution desired. The rosin may be dissolved in a borax solution if desired. Rosin may likewise be dissolved in 12.5% ammonia, alone or in combination with other alkalis, until the solution is approximately that of a milk consistency. It will be understood that a stronger aqua ammonia may be used if desired. The rosin solution thus prepared furnishes a very good mineral selective and frothing agent, and may be used alone in the flotation process of ore separation.

Shellac may be dissolved in alcohol until it is of the consistency of shellac varnish, as that is sold commercially, but it is to be understood that the shellac varnish is not the same as the shellac solution of this invention, in that the latter does not contain oils or turpentine usually accompanying the commercial shellac varnish. The shellac may also be dissolved in alkali water employing an alkali such as caustic soda, or it may be dissolved in a solution of borax, and the mixture boiled until it is of the consistency of approximately that of milk. The preferable proportion of shellac to alkali or borax to make this solution may be given as approximately four parts of shellac to one part of caustic soda or other solvent. Shellac may likewise be dissolved in ammonia by placing it in ammonia approximately ten times the weight of the shellac, producing a solution of a consistency of about that of water. These shellac solutions in combination with a rosin solution make an excellent mineral selective and frothing agent and, in addition to floating sulfids, will recover free metals, carbonates, silicate of copper and oxid of copper.

It is to be understood that the invention is not to be confined to shellac but that the shellac solutions referred to may be made from other forms of lac generally.

When any of the above solutions are used in the practice of the flotation methods, the amount of the solution to be employed can be readily gaged, by those skilled in the art, from the character of froth produced thereby. The number, size, etc. of the bubbles composing the froth serve to indicate when the desired amount of froth has been secured while the color of the froth indicates the quality thereof as a mineral selective agent. It will be only necessary for those skilled in the art to add such quantity thereof to the pulp as will produce the character of froth recognizable by them, from their experience, as that desired. It may be stated however, that these agents will produce the desired character of froth much more readily than will the oils employed in the oil flotation methods.

A combination of the copal solution with the rosin solution is desirable in that the frothing characteristic of the copal is thereby increased. Thus the combined solution utilizes the excellent mineral selective quality of the copal as well as the good frothing characteristic of the rosin and such mineral selective characteristics as the latter also possesses. As a good solution for general work on all ores it is desirable to combine the rosin solution and copal solution in the proportions, for example of four parts of copal to one part of rosin.

Oleic acid may be combined with either the rosin solution, or the rosin shellac solution, and this combination is found to assist in recovering the values from the ores. If the oleic acid is combined with the solution and that solution has been made by dissolving the resin or resins in an alkali water, the alkali in the solution neutralizes the oil of the oleic acid and this is desirable. If, however, the shellac solution, with which the oleic is combined, is a solution which has been made as the result of dissolving the shellac in an alcohol it is desirable to add to the combination of oleic acid and alcohol shellac solution, a very small amount of a caustic alkali—sufficient to neutralize the oil.

The combination of oleic acid with the rosin solution, or the rosin-shellac solution, while desirable in some respects, is not so desirable in the respect that the combined solution tends to float some of the gangue with the mineral contents of the ore so that the result is not as clean a concentrate as is secured by the use of the rosin solution, or the rosin-shellac solution. As illustrative, merely, it may be stated that a suitable combination of oleic acid with either the rosin solution, or rosin-shellac solution, is secured by adding to one gallon of either solution a very trifling amount of oleic acid, preferably not over one gram thereof. This must be boiled or otherwise heated. Instead of combining oleic acid with the rosin solution, or rosin-shellac solution, an animal oil or grease such as tallow, may be used in the place of the oleic acid in approximately the same proportions and under approximately the same conditions.

The rosin solution, or the rosin-shellac solution may have ammonia added to it so that in such case the mineral selective and frothing agent will comprise either a rosin solution ammonia mixture, or a rosin-shellac solution ammonia mixture combined before it is introduced into the ore pulp. Such a combined mixture serves to highly increase the selecting qualities of the solution on minerals. Ordinarily, the proportion of the mixture may be say twelve parts of rosin solution, or rosin-shellac solution, to one part of ammonia. It may be, however, that for some ores this mixture would prove too strong in that it would tend to float some of the gangue. Under such circumstances the mixture should be weakened by the addition of water thereto. It is impossible to lay down any specific rule concerning the strength of solution desirable for use in each case, since not only do the various characters of ores differ greatly but ores of the same character differ much in grade. It will be necessary to thin the mixture as a result of tests with respect to each particular ore and each particular grade thereof, whereupon the mixture as thus tested will be found suitable for all ores of the same character and grade.

The proportions of the alkali and resin given are general in character and the invention is not limited to such proportions. As ores differ in character, and as different grades of the same ore show marked differences as to the proportions of the various minerals contained therein, no set rule for making the frothing and selective mixture can be given. Some ores will require more resin than others, and some ores will respond more readily to a mixture containing rosin and shellac than with one containing rosin alone. The proportion of the frothing and selective material in the pulp will vary according to the nature of the ore to be acted on. The amount of the mixture is small. Generally speaking the mixture is less than 1% on the ore. In some situations caustic soda may be the best alkali. If iron be present in the ore in undesirable quantities ammonia may be employed as the alkali or ammonia and another alkali may be combined to make the mixture.

Having now described my invention, what I claim and desire to secure by Letters Patent, is:—

1. A process of concentrating ore, which comprises mixing the ore with water to form a pulp, placing an alkaline solution of rosin, lac and a fatty acid in the pulp, aerating the mass to form bubbles, whereby the bubbles will float upon the surface of the pulp and form a froth, and removing the froth from the pulp.

2. A process of concentrating ore, which comprises mixing the ore with water to form a pulp, placing an alkaline solution of rosin and shellac and a fatty acid in the pulp, aerating the mass to form bubbles, whereby the bubbles will float upon the surface of the pulp and form a froth, and removing the froth from the pulp.

3. A process of concentrating ore, which comprises mixing the ore with water to form a pulp, placing an alkaline solution of rosin and lac and copal in the pulp, aerating the mass to form bubbles, whereby the bubbles will float upon the surface of the pulp and form a froth, and removing the froth from the pulp.

4. A process of concentrating ore, which comprises mixing the ore with water to form a pulp, placing an alkaline solution of rosin and shellac and copal in the pulp, aerating the mass to form bubbles, whereby the bubbles will float upon the surface of the pulp and form a froth, and removing the froth from the pulp.

5. A process of concentrating ore, which comprises mixing the ore with water to form a pulp, placing a mixture of liquid rosin and lac and ammonia in the pulp, aerating the pulp to form bubbles, whereby the bubbles will rise to the surface and float thereon in the form of a froth, and removing the froth from the pulp.

6. A process of concentrating ore, which comprises mixing the ore with water to form a pulp, placing a mixture of liquid rosin and shellac and ammonia in the pulp, aerating the pulp to form bubbles, whereby the bubbles will rise to the surface and float thereon in the form of a froth, and removing the froth from the pulp.

7. A process of concentrating ore, which comprises mixing the ore with water to form a pulp, placing a mixture of liquid rosin and shellac and copal and ammonia in the pulp, aerating the pulp to form bubbles, whereby the bubbles will rise to the surface and float thereon in the form of a froth, and removing the froth from the pulp.

8. A process of concentrating ores, which comprises forming a pulp by adding to the finely divided ore a mixture of water and the reaction product of an alkali and rosin, and shellac dissolved in alcohol, aerating the mixture to form a froth, and separating the froth from the remainder of the pulp.

9. The process of concentrating ores, which comprises adding to the finely divided ore a mixture of water and the reaction product of caustic soda and rosin, and shellac dissolved in alcohol, aerating the mixture and separating the froth from the remainder of the pulp.

10. The process of concentrating ores, which comprises forming a pulp adding to the finely divided ore a mixture of water and the reaction product of an alkali, rosin and shellac, aerating the mixture to form a froth, and separating the the froth from the remainder of the pulp.

11. The process of concentrating ores, which comprises forming a pulp by adding to the finely divided ore a mixture of water and the reaction product of caustic soda, rosin and shellac, aerating the mixture to form a froth, and separating the froth from the remainder of the pulp.

12. The process of concentrating ores, which comprises forming a pulp of ore, water, and the reaction product of rosin, lac and an alkali, aerating the mixture to produce a froth, and separating the froth from the pulp.

13. A frothing and mineral-selective agent for use in the flotation process of concentrating ore, which comprises the reaction product of rosin and lac and ammonia.

14. A frothing and mineral-selective agent for use in the flotation process of concentrating ore, which comprises the reaction product of rosin and shellac and ammonia.

15. A frothing and mineral-selective agent for use in the flotation process of concentrating ore, which comprises the reaction product of rosin and lac and copal and ammonia.

16. A frothing and mineral-selective agent for use in the flotation process of concentrating ores, which comprises the reaction product of rosin and shellac and copal and ammonia.

This specification signed and witnessed this thirtieth day of March, 1918.

ROYER LUCKENBACH.

Witnesses:
  A. E. RENTON,
  M. I. WARD.